(12) United States Patent
Takatomi et al.

(10) Patent No.: US 6,522,523 B2
(45) Date of Patent: Feb. 18, 2003

(54) MULTI-LAYER TYPE ELECTRIC DOUBLE-LAYER CAPACITOR

(75) Inventors: Hiroshi Takatomi, Tondabayashi (JP); Hiroshi Ohmiya, Osaka (JP); Takaaki Sakai, Osaka (JP); Yoshiharu Matsuda, Suita (JP)

(73) Assignees: Daiso Co., Ltd., Osaka (JP); A School Corporation Kansai University, Osaka (JP)

(*) Notice: Subject to any disclaimer, the term of this patent is extended or adjusted under 35 U.S.C. 154(b) by 0 days.

(21) Appl. No.: 10/026,913

(22) Filed: Dec. 27, 2001

(65) Prior Publication Data

US 2002/0167784 A1 Nov. 14, 2002

(30) Foreign Application Priority Data

Dec. 28, 2000 (JP) ........................................ 2000-401112

(51) Int. Cl.$^7$ .................................................. H01G 9/00
(52) U.S. Cl. ........................................ 361/502; 361/512
(58) Field of Search ................................ 361/502, 503, 361/511, 512, 530, 504

(56) References Cited

U.S. PATENT DOCUMENTS 5,130,180 A * 7/1992 Koshizuka et al. ......... 428/195
5,168,421 A * 12/1992 Suzuki et al. ............... 29/25.42
6,180,275 B1 * 1/2001 Braun et al. ................... 429/30

FOREIGN PATENT DOCUMENTS

| JP | 62-16506 | 1/1987 |
| JP | 62-179711 | 8/1987 |
| JP | 08-250380 | 9/1996 |

\* cited by examiner

*Primary Examiner*—Anthony Dinkins
(74) *Attorney, Agent, or Firm*—Armstrong, Westerman & Hattori LLP

(57) ABSTRACT

The invention provides an electric double-layer capacitor comprising a bipolar interelectrode formed by bonding a collector to a carbon electrode with no adhesive put therebetween. The electric double-layer capacitor is so designed that a plurality of combinations of an intermediate electroconductive polymer composite electrode and a separator placed in layers between a pair of terminal electroconductive polymer composite electrodes, wherein; the intermediate electroconductive polymer composite electrode is composed of an electroconductive sheet made of a polymer substance to which electroconductivity is imparted and which has an apparent melt viscosity of from 300 to 3,000,000 poises, and a carbon electrode heat-sealed to at least one surface of the sheet, and the carbon electrode and the separator contain an electrolytic bath infiltrated thereinto.

6 Claims, 1 Drawing Sheet

MULTI-LAYER TYPE ELECTRIC DOUBLE-LAYER CAPACITOR

BACKGROUND OF THE INVENTION

1. Field of the Invention

The present invention relates to a multi-layer type electric double-layer capacitor, a type of energy storage system. More precisely, the invention relates to a multi-layer type electric double-layer capacitor that comprises composite electrodes, in which each composite electrode is formed by firmly bonding a carbon electrode to an electroconductive polymer sheet with no adhesive therebetween to integrate them.

Power leveling devices that are for storing the excess power in the nighttime so as to reduce the peak power consumption in the daytime, and economical hybrid cars that release clean exhaust gas are being much developed these days for energy saving and for global environment protection. For these, it is urgently necessary to develop high-voltage storage devices such as electric double-layer capacitors. In the field of these applications, desired are high-voltage storage devices, one of which is a multi-layer type energy storage device that comprises unit cells connected in series, and this is the most hopeful in the art.

The electrode for electric double-layer capacitors comprises a polarizable electrode layer formed on a collector, in which the polarizable electrode layer is essentially formed of active carbon having a large specific surface area. Electric double-layer capacitors are so designed that the unit cells therein each composed of a pair of such electrode layers with an insulating separator put therebetween are impregnated with an electrolytic bath. Applying a voltage between the two electrodes therein, the capacitor of this type stores the resulting charges in the electric double-layer in the interface between the electrode and the electrolytic bath, and therefore, this can store a far larger quantity of electricity than conventional capacitors. When compared with secondary batteries that undergo redox reaction, the quantity of electric energy which such an electric double-layer capacitor can store therein is not so large. However, the power output capability of the capacitor of that type, that is, the ability thereof to store and release a large quantity of electric power within a short period of time is about 10 times that of a conventional secondary battery, and, in addition, the charge-discharge cycle life of the capacitor of that type is at least 100,000 cycles, that is, the life thereof is at least 100 times that of a conventional secondary battery. Having these advantages, electric double-layer capacitors are now put into practical use in various industrial fields, for example, for back-up power sources for IC and LSI memories and actuators.

2. Description of the Related Art

The electromotive force of such an electric double-layer capacitor generally falls between 1and 3V or so, though depending on the composition of the electrolytic bath. In case where the capacitor of the type is used for a high-voltage power source, unit cells that are prepared separately are connected in series or are stacked to ensure the intended high voltage. In particular, multi-layer type electric double-layer capacitors are preferred since their space efficiency is high. Accordingly, the characteristics of multi-layer type electric double-layer capacitors are significantly influenced not only by the unit cells constituting them but also by the cell-to-cell contact resistance of the multi-layer type cells. For reducing the internal electric resistance of the multi-layer type cells, needed is an intercollector of high electroconductivity; and for increasing the energy density and the output density thereof, needed is a thin intercollector of low specific gravity. For these, proposed is a bipolar interelectrode formed by bonding a carbon electrode to both surfaces of an intercollector.

The collector, one constituent component of an electric double-layer capacitor is required to have a reduced internal electric resistance so as to be able to supply a large electric current, for which, for example, used are electroconductive foil, titanium plates and electroconductive polymer sheets. In case where a carbon electrode is bonded to a metallic collector, the two are mechanically bonded under pressure, or are bonded with an adhesive put between them. However, the former method of mechanically bonding them is problematic in that it often produces vibration or temperature fluctuation to cause cell volume change that may lead to the increase in the contact resistance of the bonded two, the reduction of the power performance thereof and the increase in the ohmic loss thereof. On the other hand, the latter method of bonding the two with an adhesive put therebetween is defective in that the adhesive used deteriorates since it is all the time kept in contact with the organic electrolytic bath and the acidic or basic aqueous electrolytic bath, and, as a result, the cell lacks long-term stability. For these reasons, it is desired to integrate the collector and the electrode with no adhesive put therebetween.

In JP-A 250380/1996, described is a method of dissolving and mixing active carbon and a binder polymer in an organic solvent such as toluene, then applying the resulting mixture onto a collector electrode and drying it thereon. However, this method has a lot of problems to solve for solvent recovery, environmental protection, human health, cost reduction and the like.

In JP-A 179711/1987 and 16506/1987, described is a method of emulsifying active carbon powder and a binder polymer followed by applying the resulting emulsion onto a collector electrode in the same manner as above. In this method, used is an aqueous emulsion which is favorable for environmental protection and human health. However, as the solid content thereof is low, the emulsion used in the method is problematic in that its production efficiency is not good and, in addition, it forms only a thin film and the mechanical strength of such a thin film made of it is low. Moreover, the technique of integrating the active carbon electrode with the collector electrode in the method requires an adhesive or an electroconductive adhesive, which is therefore problematic in point of the troublesome adhesive-coating step, the adhesion strength of the two bonded with such an adhesive, and the time-dependent change of the properties of the bonded structure including the chemical resistance thereof.

SUMMARY OF THE INVENTION

In consideration of the prior-art problems stated above, the present invention is to construct a bipolar interelectrode of low internal electric resistance by bonding a carbon electrode to a collector with no adhesive put therebetween and to provide a multi-layer type electric double-layer capacitor constructed by placing in layers unit cells each containing that bipolar interelectrode.

The present inventors have found that a carbon electrode can be firmly bonded by heat-sealing to an electroconductive sheet with no adhesive, and that the electroconductive polymer composite electrode thus constructed is significantly effective for solving the problems mentioned above.

On the basis of these findings, we have completed the present invention.

Specifically, the multi-layer type electric double-layer capacitor which the invention provides herein comprises;

a plurality of combinations of an intermediate electroconductive polymer composite electrode and a separator placed in layers between a pair of terminal electroconductive polymer composite electrodes, wherein;

the intermediate electroconductive polymer composite electrode is composed of an electroconductive sheet made of a polymer substance to which electroconductivity is imparted and which has an apparent melt viscosity of from 300 to 3,000,000 poises, and a carbon electrode heat-sealed to at least one surface of the sheet, and the carbon electrode and the separator contain an electrolytic bath infiltrated thereinto, that is, the carbon electrode and the separator are impregnated with an electrolytic bath.

DESCRIPTION OF THE PREFERRED EMBODIMENTS

Figure 1:
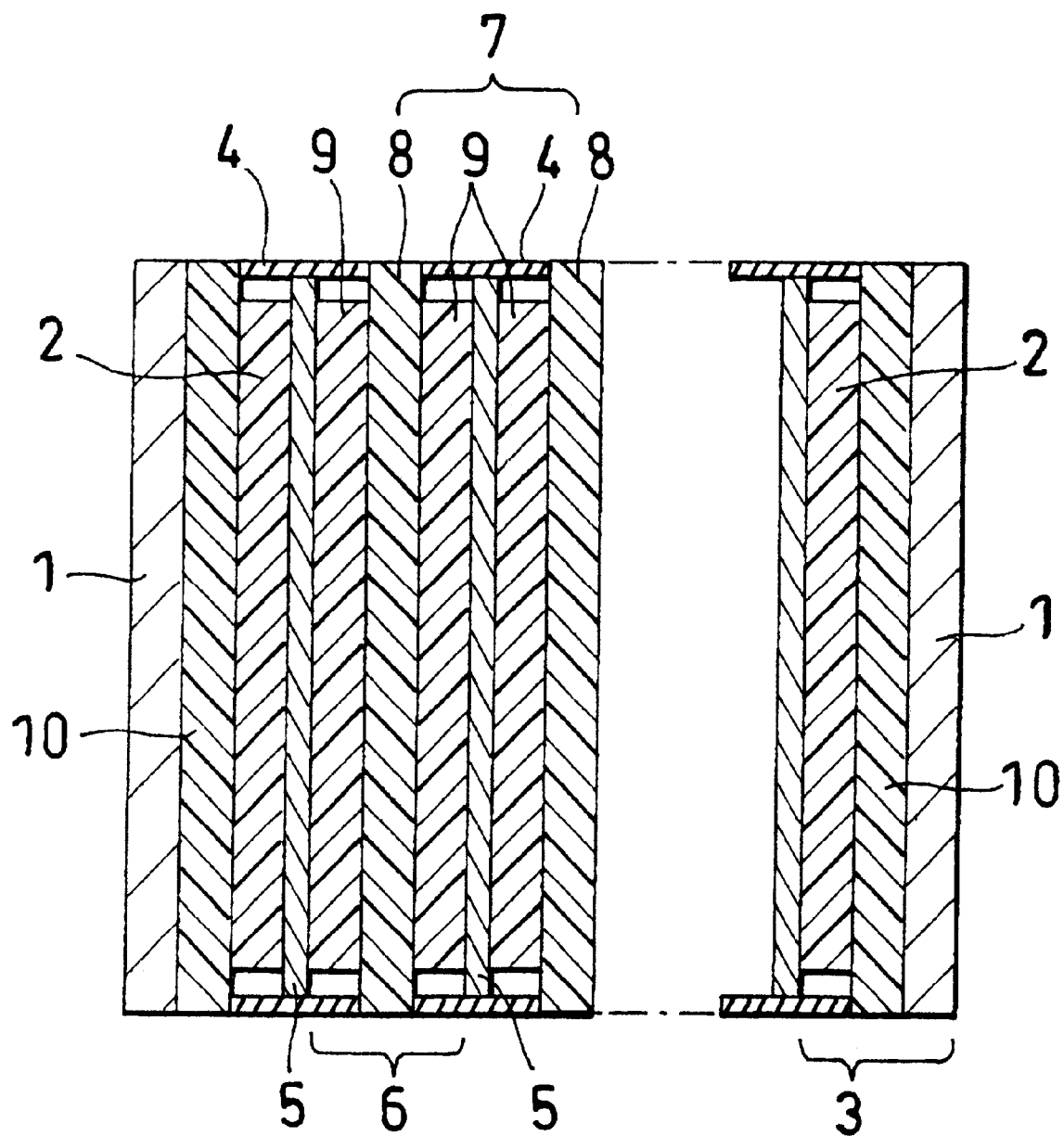
FIG. 1 is a schematic view showing one example of the electric double-layer capacitor of the invention.

The constitution of the invention is described in detail hereinunder.

Examples of the polymer substance to be the material for the intermediate electroconductive polymer composite electrode are thermoplastic resins such as polyvinyl chloride resins, polyethylene resins, polypropylene resins, polystyrene resins, ABS resins; thermoplastic elastomers such as polyvinyl chloride elastomers, polyolefin elastomers, polyester elastomers, polystyrene elastomers, chlorinated polyethylenes, ethylene-ethyl acrylate copolymers, ethylene-vinyl acetate copolymers, and their crosslinked products; and rubbers such as natural rubbers, styrene-butadiene rubbers, butyl rubbers, acrylonitrile-butadiene rubbers, ethylene-propylene rubbers, chloroprene rubbers, chlorosulfonated polyethylenes, chlorinated polyethylene rubbers, acrylic rubbers, epichlorohydrin rubbers, silicone rubbers, fluororubbers, and their crosslinked products. For this, vulcanized rubbers may be such that the non-crosslinked electroconductive sheet made of a crosslinkable rubber composition is crosslinked while or after the sheet is heat-sealed to a carbon electrode. Especially preferred are thermoplastic elastomers since a large amount of carbon black can be incorporated in it. Two or more different types of such polymer substances may be blended with no problem for use as materials. The polymer substances for use herein may be electroconductive by themselves.

Various methods have been proposed for imparting electroconductivity to polymer substances, of which preferred for industrial application is a method of incorporating an electroconductive filler in a polymer substance. The amount of the filler to be incorporated is preferably such that the volume resistivity of the mixture could be at most $10^6$ Ω·cm.

The electroconductive filler includes, for example, carbon black, electroconductive fibers, electroconductive metal powders, and inorganic or organic powders coated with electroconductive metal. Of those, preferred is carbon black including, for example, channel black, furnace black, acetylene black, thermal black, ketjen black, graphite, and long or short fibrous carbon. These may be used either singly or as combined. In view of their effect of making polymers electroconductive, more preferred are acetylene black, ketjen black and others having a structured constitution, as well as ISAF, HAF, FEF, and SRF carbons having a small particle size and having the ability to reinforce polymers. The amount of the carbon black to be added to the polymer substance preferably falls between 15 and 150 parts by weight, more preferably between 20 and 120 parts by weight per 100 parts by weight of the polymer substance. If the amount is smaller than 15 parts by weight, the polymer substance will not be well electroconductive; but if larger than 150 parts by weight, the apparent melt viscosity of the resulting electroconductive sheet will be too high even when a plasticizer or a liquid polymer is added thereto, and will be often over 3,000,000 poises.

If desired, the polymer substance to be the material for use herein may contain any additives generally used in the field of rubber plastics, for example, working promoter, lubricant, electroconductivity improver, melt viscosity adjustor, plasticizer, liquid polymer and tackifier not interfering with the electroconductivity of the polymer substance.

Also if desired, the polymer substance may contain reinforcing fibers made of, for example, carbon fibers, polyesters, nylons, vinylons.

The apparent melt viscosity of the electroconductive polymer substance falls between 300 and 3,000,000 poises. If the viscosity is over 3,000,000 poises, the workability of the polymer substance to form sheets will be poor. If so, in addition, it is difficult to heat-seal the electroconductive sheet with a carbon electrode, and the heat-seal strength of the two will be low.

For adjusting the apparent melt viscosity of the electroconductive polymer substance to be not larger than 3,000,000, selecting the polymer substance to be the starting material, and selecting the amount and the type of the electroconductive filler to be added to the starting material should be optimized. For this, also preferred is suitably adding a working promoter to the polymer substance. The working promoter includes, for example, a lubricant, a plasticizer, a stabilizer, a dispersion promoter.

The apparent melt viscosity of the polymer substance is defined as follows. In case where the polymer substance is a crystalline one, its apparent melt viscosity is the melt viscosity index thereof at a temperature at which the polymer substance is thermoformed into an electroconductive sheet; and in case where the polymer substance is an amorphous one, its apparent melt viscosity is the melt viscosity index thereof at a temperature of 150° C. and at a shear rate of 1/sec. In any case, used is, for example, a flow tester for measuring the apparent melt viscosity of the polymer substance.

The thickness of the electroconductive sheet preferably falls between 0.2 and 2 mm, more preferably between 0.3 and 1 mm, most preferably between 0.3 and 0.8 mm. The electroconductive sheet may be a multi-layered composite sheet of two or more different types made of polymer substances.

The material for the carbon electrode to be heat-sealed with the electroconductive sheet may be any of woven fabrics, nonwoven fabrics, felts or paper-made matters of active carbon fibers. The woven fabrics of active carbon fibers may be prepared by bundling from tens to thousands of monofilaments of active carbon fibers each having a filament fineness of from 10 to 250 deniers and preferably a diameter of at most 20 μm, then optionally twisting 2 or 3 such fiber bundles, and weaving them. The method of weaving them is not specifically limited, but favored are woven fabrics having a large fiber surface area. Concretely, the specific surface area of the woven fabric preferably falls between 300 and 2000 m$^2$/g. and the unit weight thereof preferably falls between 50 and 300 g/m$^2$. In general, plain woven fabrics are used herein, but twill woven fabrics and satin woven fabrics are also employable herein.

Nonwoven fabrics are prepared in a wet process or a dry process in which synthetic fibers or natural fibers are cut to have a suitable length and they are bonded together in a mode of fiber-to-fiber bonding owing to the heat-sealing force of the fibers themselves, formed into mats or thin sheets and then post-treated, for example, by steaming them. The nonwoven fabrics of the type made of active carbon fibers for use herein preferably have a surface area of from 500 to 2000 m$^2$/g, a unit weight of from 50 to 400 g/m$^2$ more preferably from 100 to 250 g/m$^2$, and a bulk density of from 0.02 to 0.08 g/cm$^3$, more preferably from 0.03 to 0.06 g/cm$^3$.

The intermediate electroconductive polymer composite electrode of the type as herein can be fabricated at low costs on an industrial scale, using, as it is, any conventional plant generally employed in the art of rubber or plastic engineering. The composite electrode comprises a thin and soft resin sheet, and is therefore lightweight and can follow the in-plant vibration and even the dimensional change at temperatures falling between 0° C. and 60° C. or so. In addition, it is resistant to chemicals of, for example, aqueous electrolytic baths, organic electrolytic baths and gel electrolytes, and changes little with time.

The separator to be combined with the intermediate electroconductive polymer composite electrode is porous. For example, it is preferably made of a hydrophilicated nonwoven fabric of polypropylene. Its thickness preferably falls between 0.02 and 0.5 mm.

The electrolytic bath for use herein is not specifically limited. For example, it includes an organic electrolytic bath prepared by dissolving tetraethylammonium tetrafluoroborate or tetrabutylammonium perchlorate in an organic solvent such as propylene carbonate or sulforane; an aqueous electrolytic bath such as diluted hydrochloric acid; and a polyelectrolytic bath prepared by adding a polymer substance to any of these. In case where the capacitor of the invention is used in automobiles or in large-scale power sources such as those for nighttime power storage, preferred for it is an aqueous electrolytic bath free from the risk of flammability or firing from the viewpoint of the safety of the capacitor. On the other hand, when the capacitor is used for energy regeneration in regenerative brake equipment in and out of which a large quantity of current goes all at a time, preferred for it is an aqueous electrolytic bath that contains an acid and at least one lanthanoid element salt capable of ensuring good charge-discharge characteristics even in high-current density condition.

Next described is a method of manufacturing the capacitor of the invention.

For preparing the electroconductive sheet for the capacitor, employable is any conventional method generally used in the art of rubber or plastic engineering. For example, using any of mixing rolls, various types of kneaders, Banbury mixers and double-screw extruders, an electroconductive filler is added to the starting material, polymer substance, and optionally, any of compounding ingredients, reinforcing fibers, working promoters, as well as vulcanizing agents, vulcanization promoters, organic peroxides and resin-crosslinking agents are added thereto, and all of these thus mixed are kneaded at around the melting point of the polymer substance, for example, at a temperature falling between 80 and 180° C., and then processed with an open roll or the like to sheets, ribbons or pellets, which are then finally formed through an extruder, a calender roll or the like into the intended type of sheets. The thickness of the sheet preferably falls between 0.3 and 1 mm.

Next, a carbon electrode is heat-sealed to one or both surfaces of the thus-obtained electroconductive sheet by topping or extrusion with a hot press, a calender roll or the like.

The thus-constructed, intermediate electroconductive polymer composite electrode may be or may not be subjected to crosslinking treatment. In case where an aqueous electrolytic bath is used for it, the crosslinking treatment may be omitted. However, in case where an organic electrolytic bath of propylene carbonate, butyrolactam or the like is used, it is desirable that the composite electrode is subjected to crosslinking treatment.

When the composite electrode is to be subjected to crosslinking treatment, in advance to the starting polymer substance added is any of sulfur, thioureas, diamines, mercaptotriazines and the like that serve as a vulcanizing agent, along with a vulcanization promoter, an organic peroxide, a resin-crosslinking agent or the like, and the electroconductive sheet of the polymer substance is crosslinked while or after a carbon electrode is heat-sealed to it. The condition for the crosslinking treatment varies, depending on the type and the amount of the vulcanizing agent, the vulcanization promoter and the crosslinking agent used, but may be such that the temperature falls between 100 and 200° C. and the time falls between a few minutes and 120 minutes. Any type of crosslinking devices are usable herein, including, for example, a hot press for thermal crosslinking, and a steam pan for pressure steam crosslinking. Also employable herein is crosslinking in a salt bath, as well as UHF or high-frequency crosslinking, lead-coating crosslinking, or resin-coating crosslinking.

The thus-constructed, intermediate electroconductive polymer composite electrode serves as a bipolar interelectrode in the capacitor of the invention.

In the next stage, at the two ends of the capacitor, one is to be the positive electrode and the other is to be the negative electrode, disposed is a terminal electroconductive polymer composite electrode that comprises a metallic collector, a terminal electroconductive sheet and a terminal carbon electrode The metallic collector is made of, for example, titanium, stainless steel or tantalum, but may also be made of graphite or the like carbon material. The terminal electroconductive sheet and the terminal carbon electrode may be the same as those constituting the intermediate electroconductive polymer composite electrode. The metallic collector, the terminal electroconductive sheet and the terminal carbon electrode may be bonded to each other with an electroconductive adhesive put therebetween, and may be merely physically bonded under pressure. Preferably, they are heat-sealed to each other.

Next, two or more combinations of the intermediate electroconductive polymer composite electrode, that is, the bipolar interelectrode and the separator are placed in layers between a pair of the terminal electroconductive polymer composite electrodes. In this, preferably, the intermediate electroconductive polymer composite electrode comprises an electroconductive sheet specifically defined herein and a carbon electrode heat-sealed to one surface of the sheet.

Next, an electrolytic bath is infiltrated into the carbon electrode and the separator. Through the process, an electric double-layer capacitor is finished.

EXAMPLES

The invention is described in detail with reference to the following Examples which, however, are not intended to restrict the scope of the invention. Not overstepping the scope and the spirit thereof, the invention encompasses any other modification and changes of the embodiments illustrated herein. Production Examples 1 to 3 given hereinunder are to demonstrate the production of the intermediate electroconductive polymer composite electrode that serves as a bipolar interelectrode in the electric double-layer capacitor of the invention.

In the following Production Examples, the melt viscosity of the electroconductive polymer substance used is measured by the use of a flow tester, Shimadzu Seisakusho's Model CFT-500C. The apparent melt viscosity of the polymer substance is calculated according to the following formula:

Numerical Formula to indicate apparent melt viscosity (poise):

$$VI=(\pi R^4 P)/(8QL)$$

wherein,

VI indicates the apparent melt viscosity (poise) of the polymer substance tested, R indicates the radius (cm) of the nozzle used, P indicates the pressure ($dyn/cm^2$) in the test, Q indicates the rate of efflux (ml/sec) of the polymer substance, L indicates the length (cm) of the nozzle.

The volume resistivity of the electroconductive polymer substance is measured by the use of a resistivity meter, Mitsubishi Yuka's ROLESTA APMCP-T400, at 23° C. and 55% RH.

Production Example 1:

Chlorinated polyethylene (Daiso's commercial product, having a chlorine content of 35%) 55 wt.pts.

Polyethylene (Nippon Unicar's commercial product, having a density of 0.92) 5 wt.pts.

Stabilizer (tin compound, Nitto Chemical's commercial product, TVS#2000) 2 wt.pts.

Carbon black (HAF, Tokai Carbon's commercial product, Seast 3) 40 wt.pts.

The above ingredients were put into a one-liter pressure kneader heated at 100° C., and kneaded therein at 40 rpm for 8 minutes. In this stage, the resin temperature was 155° C. The resulting mixture was transferred into an 8-inch open roll at about 155° C., and formed thereon into a sheet having a thickness of 0.8 mm. This is an electroconductive sheet (A).

The apparent melt viscosity of the electroconductive sheet (A) at 150° C. and at a shear rate of 1/sec was 1,100,000 poises, and the volume resistivity thereof at 23° C. and 55% RH was $3.1 \times 10^1$ Ω·cm.

The electroconductive sheet (A) was cut into a test piece of 140 mm ×140 mm in size. In the center of both the face and the back of the test piece, disposed was a woven fabric of active carbon fibers to be a carbon electrode (Toyo Boseki's BW554, having a specific surface area of 1200 $m^2/g$, a unit weight of 180 $g/m^2$, a thickness of 0.6 mm and a size of 100 mm×100 mm). The resulting sandwich structure was put into a mold, preheated therein at 150° C. for 4 minutes and then heated for 4 minutes under a pressure of 20 $kgf/cm^2$. With that, this was transferred onto a cooling press under the same pressure condition, and cooled thereon to room temperature.

In the thus-constructed, intermediate electroconductive polymer composite electrode, the intermediate carbon electrode was firmly heat-sealed to both the face and the back of the intermediate electroconductive sheet (A), and the surface of the composite electrode had the fibrous pattern of the carbon electrode just as it was. There was no reduction in the surface area of the composite electrode. The composite electrode thus obtained serves as a low-resistance bipolar interelectrode.

Production Example 2:

| | |
|---|---|
| NBR (Nippon Synthetic Rubber's commercial product, N-230S, having an acrylonitrile content of 32%) | 90 wt. pts. |
| Chlorinated polyethylene (Daiso's commercial product, having a chlorine content of 40%) | 10 wt. pts. |
| Carbon black (HAF, Tokai Carbon's commercial product, Seast 3) | 70 wt. pts. |
| Zinc white | 5 wt. pts. |
| Stearic acid | 1.0 wt. pts. |
| Plasticizer | 15 wt. pts. |
| 2-Mercaptobenzothiazole (vulcanization promoter, Ohuchi Shinko's commercial product) | 0.125 wt. pts. |
| Tetramethylthiuram disulfide (vulcanization promoter, Ohuchi Shinko's commercial product) | 0.375 wt. pts. |
| Sulfur (vulcanizing agent) | 0.375 wt. pts. |

The above ingredients except the vulcanization promoters and the sulfur were put into a one-liter pressure kneader heated at 100° C., and kneaded therein at 40 rpm for 7 minutes. In this stage, the resin temperature was 155° C. The resulting mixture (A) was transferred into a 7-inch open roll at about 70° C., to which was added the above vulcanization promoters and sulfur. These were mixed and formed into a sheet having a thickness of 0.8 mm. This is an electroconductive sheet (B).

The apparent melt viscosity of the mixture (A) at 150° C. and at a shear rate of 1/sec was 120,000 poises, and the volume resistivity of the electroconductive sheet (B) at 23° C. was $5.2 \times 10^2$ Ω·cm.

The electroconductive sheet (B) was cut into a test piece of 140 mm×140 mm in size. In the center of both the face and the back of the test piece, disposed was a woven fabric of active carbon fibers to be,a carbon electrode (Toyo Boseki's BW554, having a specific surface area of 1200 $m^2/g$, a unit weight of 180 $g/m^2$, a thickness of 0.6 mm and a size of 100 mm×100 mm). The resulting sandwich structure was put into a mold, and heated herein at 165° C. under a pressure of 10 $kgf/cm^2$ for 12 minutes.

In the thus-constructed, vulcanized product of intermediate electroconductive polymer composite electrode, the intermediate carbon electrode was firmly heat-sealed to both the face and the back of the intermediate electroconductive sheet (B), and the surface of the composite electrode had the fibrous pattern of the carbon electrode just as it was. There was no reduction in the surface area of the composite electrode. The composite electrode thus obtained serves as a low-resistance bipolar interelectrode.

Production Example 3

| | |
|---|---|
| Chlorinated polyethylene (Daiso's commercial product, having a chlorine content of 35%) | 30 wt. pts. |
| Polyethylene (Nippon Unicar's commercial product, having a density of 0.92) | 6 wt. pts. |

-continued

| | |
|---|---|
| Stabilizer (tin compound, Nitto Chemical's commercial product, TVS#2000) | 2 wt. pts. |
| Graphite powder (SEC's commercial product) | 62 wt. pts. |

Using the above ingredients, an intermediate electroconductive sheet (C) was produced and worked into an intermediate polymer composite electrode in the same manner as in Production Example 1.

The apparent melt viscosity at 150° C. and at a shear rate of 1/sec of the intermediate electroconductive sheet (C) was 2,000,000 poises; and the volume resistivity thereof at 23° C. and 55% RH was $2.0 \times 10^0$ Ω·cm.

Example 1

As in FIG. 1, a metallic collector (1) made of titanium (140 mm×140 mm); a terminal electroconductive sheet (10) (140 mm×140 mm) made of the vulcanized product of the intermediate electroconductive sheet (B) produced in Production Example 2: and a woven fabric of active carbon fibers (Toyo Boseki's BW554, having a thickness of 0.6 mm and a size of 100 mm×100 mm) to be a terminal carbon electrode (2), having a size of 100 mm×100 mm and a unit weight of 180 g/m$^2$, were superimposed in that order. The resulting, three-layered structure was put into a mold and hot-pressed therein at 160° C. and under a pressure of 10 kgf/cm$^2$ for 12 minutes. In the structure thus pressed, the constitutive layers were firmly heat-sealed to each other. A pair of the thus-constructed, terminal electroconductive polymer composite electrodes (3), (3) each composed of the metallic collector,(1), the terminal electroconductive sheet (10) and the terminal carbon electrode (2) were so disposed at the both ends of a capacitor that they could serve as a positive electrode and a negative electrode and that the metallic collector (1) could face outside.

Next, ten combinations of an intermediate electroconductive polymer composite electrode (6) and a separator (5) were placed in layers between the pair of the terminal electroconductive polymer composite electrodes (3), (3). The intermediate electroconductive polymer composite electrode (6) that serves as a bipolar interelectrode is the valcanized sandwich structure produced in Production Example 2. This is composed of an intermediate electroconductive sheet (8) and an intermediate carbon electrode (9) heat-sealed to both the face and the back of the sheet (8). One separator (5) was so disposed between one terminal electroconductive polymer composite electrodes (3) and one of the above-mentioned combinations that the additional separator (5) could be put between the terminal carbon electrode (2) and the intermediate carbon electrode (9) of the intermediate electroconductive polymer composite electrode (6) adjacent to the terminal electrode (3).

In that manner, the additional separator (5) is put between the terminal electrode (3) and one of the above-mentioned combinations adjacent thereto. The separator (5) is made of a hydrophilicated, nonwoven polypropylene fabric having a thickness of 0.1 mm. The space between the protruding ends of the neighboring intermediate electroconductive sheets (8), (8), and the space between the protruding ends of the terminal electroconductive sheet (10) and the intermediate electroconductive sheet (8) adjacent thereto are all tightly packed with packing (4) made of chloroprene rubber. Each unit cell (7) serving as the essential element of the electric double-layer capacitor is composed of a half of one intermediate electroconductive sheet (8), the intermediate carbon electrode (9), the separator (5) and a half of the other intermediate electroconductive sheet (8).

Next, the intermediate carbon electrode and the separator were impregnated with an electrolytic bath, 1 mol/liter HCl aqueous solution containing 1 mol/liter lanthanum chloride, in the layered structure. Thus was prepared an electric double-layer capacitor.

The electric double-layer capacitor was tested for the charge-discharge cycle durability. In the test, the charge voltage was 8 V; the discharge voltage was 2 V; the charge current was 0.5 A (current density, 5 mA/cm$^2$); and the discharge current was 1.0 A (current density, 10 mA/cm$^2$). The test results are mentioned below.
Energy in charging: 97.05 coulombs
Capacity in charging: 16.18 farads
Energy in discharging: 97.00 coulombs
Capacity in discharging: 16.17 farads
Charge efficiency: 99.5%

From the test data as above, it is understood that the unit cell performance of the electric double-layer capacitor prepared herein is lowered little in repeated charge-discharge cycles. In addition, the capacitor was subjected to 100,000 charge-discharge cycles under the same condition as above. In the cycle test, there was no change in the internal electric resistance of the capacitor, and the reduction in the discharge capacity of the capacitor was at most 3%. After the test, the appearance of the capacitor did neither change nor worsen at all.

Example 2

An electric double-layer capacitor was prepared in the same manner as in Example 1, for which, however, 40 wt. % diluted sulfuric acid was used for the electrolytic bath. This was tested for the charge-discharge cycle durability also in the same manner as in Example 1. The test results are mentioned below.
Energy in charging: 90.50 coulombs
Capacity in charging: 15.09 farads
Energy in discharging: 89.75 coulombs
Capacity in discharging: 14.96 farads
Charge efficiency: 99.2%

From the test data as above, it is understood that the unit cell performance of the electric double-layer capacitor prepared herein is lowered little in repeated charge-discharge cycles. In addition, the capacitor was subjected to 100,000 charge-discharge cycles under the same condition as above. In the cycle test, there was no change in the internal electric resistance of the capacitor, and the reduction in the discharge capacity of the capacitor was at most 3%. After the test, the appearance of the capacitor did neither change nor worsen at all.

Example 3

An electric double-layer capacitor was prepared in the same manner as in Production Example 2 and Example 1. For this, however, a Toyo Boseki's commercial product, BW552 (having a thickness of 0.6 mm and a unit weight of 180 g/m$^2$) was used for the woven active carbon fabric in the process of Production Example 2; and a propylene carbonate solution of tetraethylammonium tetrafluoroborate (0.8 mols/liter) was used for the electrolytic bath in the process of Example 1. This was tested for the charge-discharge cycle durability also in the same manner as in Example 1. In the test, however, the charge voltage was 20 V and the discharge voltage was 5 V. The test results are mentioned below.
Energy in charging: 30.15 coulombs Capacity in charging: 5.03 farads
Energy in discharging: 29.37 coulombs
Capacity in discharging: 4.90 farads
Charge efficiency: 97.4%

In addition, the capacitor was subjected to 10,000 charge-discharge cycles under the same condition as above. In the cycle test, the reduction in the discharge capacity of the capacitor was at most 5%, and the charge-discharge cycle durability of the capacitor is good.

Example 4

The electric double-layer capacitor prepared in Example 1 was tested for the charge-discharge cycle durability also in the same manner as in Example 1, for which, however, the charge current was 2.0 A (current density, 20 mA/cm$^2$) and the discharge current was 5.0 A (current density, 50 mA/cm$^2$). The test results are mentioned below.
Energy in charging: 75.80 coulombs
Capacity in charging: 12.63 farads
Energy in discharging: 73.60 coulombs
Capacity in discharging: 12.27 farads
Charge efficiency: 97.1%

From the test data as above, it is understood that the capacity of the electric double-layer capacitor is lowered little even in repeated charge-discharge cycles at a large discharge current density of 50 mA/cm$^2$. This means that the capacitor is practicable for high-voltage power sources in and out of which a large quantity of current goes within a short period of time. In addition, the capacitor was subjected to 10,000 charge-discharge cycles under the same condition as above. In the cycle test, there was no change in the internal electric resistance of the capacitor, and the reduction in the discharge capacity of the capacitor was at most 3%. After the test, the appearance of the capacitor did neither change nor worsen at all.

Example 5

An electric double-layer capacitor was prepared in the same manner as in Example 1, for which, however, used was the intermediate electroconductive sheet (C) produced in Production Example 3 and not the intermediate electroconductive sheet (B) produced in Production Example 2. The capacitor thus prepared herein was tested for the charge-discharge cycle durability also in the same manner as in Example 1, for which, however, the charge current was 2.0 A (current density, 20 mA/cm$^2$) and the discharge current was 5.0 A (current density, 50 mA/cm$^2$) The test results are mentioned below.
Energy in charging: 83.10 coulombs
Capacity in charging: 13.85 farads
Energy in discharging: 82.00 coulombs
Capacity in discharging: 13.67 farads
Charge efficiency: 98.7%

From the test data as above, it is understood that the capacity of the electric double-layer capacitor is lowered little even in repeated charge-discharge cycles at a large discharge current density of 50 mA/Cm$^2$. This means that the capacitor is practicable for high-voltage power sources in and out of which a large quantity of current goes within a short period of time. In addition, the capacitor was subjected to 50,000 charge-discharge cycles under the same condition as above. In the cycle test, there was no change in the internal electric resistance of the capacitor, and the reduction in the discharge capacity of the capacitor was at most 2%. After the test, the appearance of the capacitor did neither change nor worsen at all.

Example 6

As in FIG. 1, a metallic collector (1) made of stainless steel, (140 mm×140 mm) was disposed at the both ends of the capacitor to be a positive electrode and a negative electrode. To the inner surface of each metallic collector (1), adhered was a terminal electroconductive sheet (10) (140 mm×140 mm) made of the vulcanized product of intermediate electroconductive sheet (B) produced in Production Example 2 with an electroconductive adhesive put therebetween, and the adhered area of the two was completely dried. Next, on the inner surface of each terminal electroconductive sheet (10), disposed was a terminal carbon electrode (2) (100 mm×100 mm) made of a woven fabric of active carbon fibers (Toyo Boseki's commercial product, BW554) to be a polarizable electrode. Through the process, prepared was a terminal electroconductive polymer composite electrode (3) comprising the metallic collector (1), the terminal electroconductive sheet (10) and the terminal carbon electrode (2), at the both ends of the capacitor.

Except the above, the same process as in Example 1 was repeated to complete an electric double-layer capacitor.

The advantages of the invention are described below.

The multi-layer type electric double-layer capacitor of the invention comprises, as the constituent components, intermediate electroconductive polymer composite electrodes that are thin, lightweight and flexible. Therefore, it can follow the in-plant vibration and even the dimensional change at varying ambient temperatures.

The intermediate electroconductive polymer composite electrodes of the type for the capacitor can be manufactured at low costs on an industrial scale, using, as it is, any conventional plant generally employed in the art of rubber or plastic engineering, and their reproducibility and quality are good. In addition, they are resistant to chemicals of, for example, electrolytic baths including gel electrolytes, and change little with time.

Moreover, the intermediate electroconductive polymer composite electrodes that constitute the capacitor of the invention are free from the risk of adhesive deterioration, and therefore stably exhibit low resistance and high power performance for a long period of time. Comprising the composite electrodes of that type, the capacitor of the invention ensures high voltage and large capacity, and can be manufactured at low costs.

What is claimed is:

1. A multi-layer type electric double-layer capacitor comprising;

a plurality of combinations of an intermediate electroconductive polymer composite electrode and a separator placed in layers between a pair of terminal electroconductive polymer composite electrodes, wherein;
the intermediate electroconductive polymer composite electrode is composed of an electroconductive sheet made of a polymer substance to which electroconductivity is imparted and which has an apparent melt viscosity of from 300 to 3,000,000 poises, and a carbon electrode heat-sealed to at least one surface of the sheet, and
the carbon electrode and the separator are impregnated with an electrolytic bath.

2. The multi-layer type electric double-layer capacitor as claimed in claim 1, wherein the polymer substance is a thermoplastic elastomer or rubber.

3. The multi-layer type electric double-layer capacitor as claimed in claim 1 or 2, wherein the electroconductive polymer substance contains an electroconductive filler incorporated therein.

4. The multi-layer type electric double-layer capacitor as claimed in claim 3, wherein the electroconductive filler is carbon black, electroconductive fibers, electroconductive metal powders, or electroconductive metal-plated inorganic or organic powders.

5. The multi-layer type electric double-layer capacitor as claimed in claim 1 or 2, wherein the electroconductive sheet is a non-crosslinked electroconductive sheet made of a crosslinkable rubber composition, and the sheet is crosslinked while or after it is heat-sealed to the a carbon electrode.

6. The multi-layer type electric double-layer capacitor as claimed in claim 1 or 2, wherein the electrolytic bath is an aqueous solution containing at least one lanthanoid element salt and at least one acid.

* * * * *